United States Patent [19]

Lay et al.

[11] Patent Number: 4,869,867
[45] Date of Patent: Sep. 26, 1989

[54] NUCLEAR FUEL

[75] Inventors: Kenneth W. Lay, Schenectady, N.Y.; Herman S. Rosenbaum, Fremont; John H. Davies, San Jose, both of Calif.

[73] Assignee: General Electric Company, Schenectady, N.Y.

[21] Appl. No.: 125,630

[22] Filed: Nov. 25, 1987

[51] Int. Cl.⁴ .................................................. G21C 3/00
[52] U.S. Cl. ..................................... 376/421; 252/636; 252/638; 264/0.5; 423/255; 423/261
[58] Field of Search ........................ 376/421, 422, 901; 264/0.5; 252/636, 638; 423/255, 261

[56] References Cited

U.S. PATENT DOCUMENTS

| | | | |
|---|---|---|---|
| 3,263,004 | 7/1966 | Bean | 264/0.5 |
| 3,501,411 | 3/1970 | Triggiani et al. | 252/301.1 |
| 3,679,596 | 7/1972 | Hill et al. | 252/301.1 R |
| 3,715,273 | 2/1973 | Rigby et al. | 376/421 |
| 3,826,754 | 7/1974 | Grossman et al. | 252/301.1 R |
| 3,867,489 | 2/1975 | Rubin | 264/0.5 |
| 3,872,022 | 3/1975 | Hollander et al. | 252/301.1 R |
| 3,883,623 | 5/1975 | Lay | 264/0.5 |
| 3,923,933 | 12/1975 | Lay | 264/0.5 |
| 3,927,154 | 12/1975 | Carter | 264/0.5 |
| 4,052,330 | 10/1977 | Jensen et al. | 252/301.1 R |
| 4,094,738 | 6/1978 | Chubb | 376/421 |
| 4,264,540 | 4/1981 | Butler | 264/0.5 |
| 4,401,608 | 8/1983 | Smith | 264/0.5 |

FOREIGN PATENT DOCUMENTS 55-27942  2/1980  Japan .

Primary Examiner—Donald P. Walsh
Attorney, Agent, or Firm—Jane M. Binkowski; James C. Davis, Jr.; James Magee, Jr.

[57] ABSTRACT

A particulate mixture of uranium dioxide and additive of magnesium aluminosilicate composition is formed into a compact and sintered to produce a nuclear fuel wherein the uranium dioxide grains have an average grain size of at least about 20 microns and wherein substantially all of the grains are each enveloped with glassy magnesium aluminosilicate phase.

33 Claims, 1 Drawing Sheet

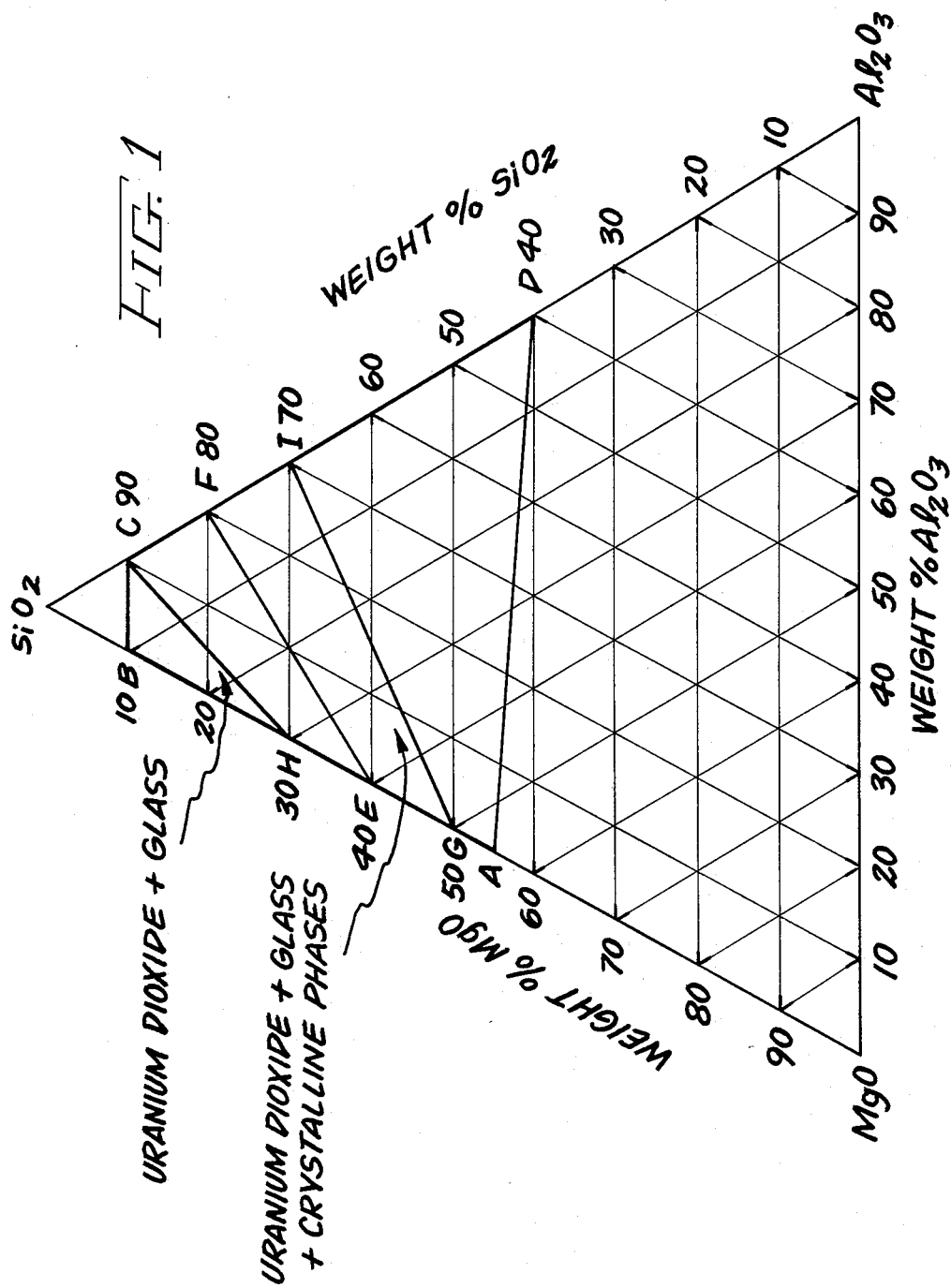

NUCLEAR FUEL

In copending Ser. No. 123,616 filed on Nov. 20, 1987, for "Nuclear Fuel", Lay et al., assigned to the assignee hereof and incorporated herein by reference, there is disclosed that a mixture of uranium dioxide and aluminosilicate sintering agent is formed into a compact and sintered to produce a nuclear fuel wherein the uranium dioxide grains have an average grain size of at least about 20 microns and wherein the grains are coated with glassy aluminosilicate phase.

In copending Ser. No. 124,126 filed on Nov. 23, 1987, for "Nuclear Fuel", Lay et al., assigned to the assignee hereof and incorporated herein by reference, there i disclosed that a mixture of uranium dioxide and magnesium silicate sintering agent is formed into a compact and sintered to produce a nuclear fuel wherein the uranium dioxide grains have an average grain size of at least about 20 microns and wherein the grains are coated with glassy magnesium silicate phase.

This invention relates to the production of a nuclear fuel body with improved mechanical properties. In one aspect, it is directed to firing a compact of particular composition comprised of uranium dioxide and a magnesium aluminosilicate to produce a nuclear fuel of particular microstructure.

Nuclear reactors are presently being designed, constructed and operated in which the fissionable material or nuclear fuel is contained in fuel elements which may have various geometric shapes, such as plates, tubes or rods. Nuclear fuel is enclosed usually in a corrosion-resistant, non-reactive, heat conductive container or clad which as assembled with the nuclear fuel is called a fuel element. The fuel elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reactor. The core is enclosed within a reactor vessel through which a coolant is passed.

The clad serves two primary purposes: first, to prevent contact and chemical reactions between the nuclear fuel and either the coolant or moderator if present, or both; and second, to prevent the highly radioactive fission products, some of which are gases, from being released from the fuel into the coolant or moderator or both. Common clad materials are stainless steel, aluminum and its alloys, zirconium and its alloys, niobium (columbium), certain magnesium alloys and others. The failure of the clad, due to the buildup of gas pressure or high temperatures in the fuel, or due to corrosion of the clad by deleterious fission products, can contaminate the coolant or moderator and the associated steam systems with intensely radioactive long-lived products to a degree which interferes with plant operation.

The present theoretical and experimental information indicates that a larger grain size in uranium dioxide nuclear fuel will reduce fission gas release rates, a desired attribute which would result in either reduced void space in the fuel rod or an increased design burn-up life for the fuel. Unfortunately, as grain size is increased, the high temperature creep rate of the fuel is reduced - an undesirable result since this gives a greater strain on the clad during a reactor power ramp. Such fuel-induced cladding strain can lead to a cladding failure via a mechanism known as PCI (Pellet Clad Interaction). A fuel with both a larger grain size and an increased creep rate is therefore of interest. Such a fuel is provided by the present invention.

The present nuclear fuel has a microstructure which is useful in avoiding cladding failure. Specifically, the present fuel is a sintered body comprised of uranium dioxide grains having an average size of at least about 20 microns whereas the grains are surrounded by a glassy magnesium aluminosilicate phase. At an elevated temperature, generally at about 1000° C. and higher, the glassy phase increases the creep rate or plasticity of the sintered body significantly above that of uranium dioxide.

Those skilled in the art will gain a further and better understanding of the present invention from the detailed description set forth below, considered in conjunction with FIG. 1 forming a part of the specification which is a composition diagram showing the composition ranges of the present sintering agent in the ternary system comprised of $Al_2O_3$, $SiO_2$ and MgO. FIG. 1 is plotted in weight %. The lower axis indicates weight % $Al_2O_3$, the axis on the left gives weight % MgO and the one on the right indicates weight % $SiO_2$. In FIG. 1, polygon ABCD excluding lines AB and CD encompasses and defines the composition of the present sintering agent.

Briefly stated, the present process for producing a sintered uranium dioxide body wherein the uranium dioxide grains have an average size of at least about 20 microns and wherein at least about 99% by volume of said grains are each coated with glassy magnesium aluminosilicate phase leaving no significant portion thereof exposed comprises providing a sinterable uranium dioxide powder containing a fissionable substance, providing a material with a sintering agent composition encompassed and defined by polygon ABCD excluding lines AB and CD of FIG. 1 or precursor therefor, admixing said material with said uranium dioxide powder to give said sintering agent composition ranging from about 0.1% by weight to about 1% by weight of a mixture comprised of sintering agent composition and uranium dioxide, forming the resulting mixture into a compact, sintering said compact at a temperature at which said sintering agent is a liquid ranging from greater than about 1500° C. to a temperature at which there is no significant vaporization of $SiO_2$ to produce a sintered product having said average grain size and cooling said product producing said sintered body, said precursor thermally decomposing below said sintering temperature.

By "glass", "glassy" or "glassy magnesium aluminosilicate" it is meant herein an amorphous magnesium aluminosilicate.

In carrying out the present process, a sinterable uranium dioxide powder is provided containing a fissionable material or substance in an amount effective for making the resulting sintered body useful as nuclear fuel. Representative of such a fissionable material is uranium such as U-235 and plutonium such as Pu-239. Normally, uranium dioxide powder contains a fissionable isotope of uranium, and frequently it is enriched with such isotope. These powders are known in the art and generally contain a fissionable isotope of uranium in an amount ranging from about 0.1% by weight to about 5% by weight of the uranium dioxide powder. The uranium dioxide powder has a total oxygen to a total uranium atomic ratio (O/U ratio) ranging from about 1.7 to about 2.25, frequently from greater than about 2.00 to about 2.15.

Generally, the uranium dioxide powder used in the present process has a specific surface area ranging from about 2 to 12 square meters per gram, preferably from about 4 to 8 square meters per gram. Such powders allow sintering to be carried out within a reasonable length of time at the present sintering temperature. Uranium dioxide powder having a smaller surface area usually is not useful because it would require sintering temperatures too high to be practical and extraordinary measures to prevent evaporation of $SiO_2$. On the other hand, uranium dioxide powders having a larger surface area are difficult to handle because of their high chemical reactivity.

The present sintering agent has a composition encompassed and defined by polygon ABCD excluding lines AB and CD of FIG. 1.

The weight % composition of particular points in FIGS. 1 are given in Table I:

| Point | MgO | $Al_2O_3$ | $SiO_2$ |
|-------|-----|-----------|---------|
| A | 55 | — | 45 |
| B | 10 | — | 90 |
| C | — | 10 | 90 |
| D | — | 60 | 40 |
| E | 40 | — | 60 |
| F | — | 20 | 80 |
| G | 50 | — | 50 |
| H | 30 | — | 70 |
| I | — | 30 | 70 |

The composition encompassed and defined by polygon ABCD excluding lines AB and CD of FIG. 1 is comprised of from about 40 weight % to about 90 weight % $SiO_2$ with the balance being comprised of MgO and $Al_2O_3$. Maximum MgO content of the sintering agent is about 55% by weight, and maximum $Al_2O_3$ content is less than about 60% by weight, of the sintering agent. In the present sintering agent, MgO and $Al_2O_3$ are always present in at least a detectable amount, i.e. an amount detectable by chemical analysis. Frequently, MgO and $Al_2O_3$ are each present in an amount of at least about 0.01% by weight, or at least about 0.1% by weight, of the sintering agent.

The present sintering agent has the composition of a magnesium aluminosilicate which can be in a number of forms. For example, it can be selected from the group consisting of magnesium aluminosilicate, a combination of MgO, $Al_2O_3$ and $SiO_2$, a combination of aluminosilicate and MgO, a combination of magnesium silicate and $Al_2O_3$, a combination of magnesium aluminate and $SiO_2$, and a mixture thereof.

If desired, a particulate precursor for the sintering agent or part thereof can be used provided that it thermally decomposes completely at an elevated temperature below sintering temperature to form the sintering agent or part thereof and by product gas leaving no significant deleterious residue. Magnesium carbonate and magnesium nitrate are useful precursors for magnesium oxide.

If desired, the present sintering agent can be preformed by a number of techniques such as by melting or solid state sintering of a mixture of powders of MgO, $Al_2O_3$ and $SiO_2$.

Also, if desired, at least part of the present sintering agent can be in the form of a natural material preferably predominantly comprised of the sintering agent composition. For example, bentonite and clay can be used to provide aluminosilicate, and talc can be used to provide magnesium silicate. Specifically, the natural material should be a material which, when fired, but before reaching sintering temperature, has a fired composition comprised of the desired sintering agent composition, or part thereof, and impurities in an amount of less than about 10% by weight of the fired composition. The impurities remaining in the fired composition should have no significant deleterious effect on the present nuclear fuel.

The sintering agent is used in an amount ranging from about 0.1% by weight to about 1% by weight of the mixture comprised of uranium dioxide powder and sintering agent. The particular amount of sintering agent used is determinable empirically and depends largely on the particular sintered body desired. Frequently, the present sintering agent ranges from about 0.1% by weight to about 0.8% by weight, or from about 0.2% by weight to about 0.6% by weight, or from about 0.25% by weight to about 0.5% by weight, of the total weight of the mixture comprised of uranium dioxide and sintering agent. In one embodiment, the sintering agent ranges for about 0.1% by weight to less than about 0.5% by weight, or from about 0.1% by weight or 0.2% by weight to about 0.4% by weight, of the mixture comprised of uranium dioxide powder and sintering agent.

The sintering agent and/or source thereof can be admixed with the uranium dioxide powder by a number of conventional techniques, and preferably, they are admixed to form a mixture wherein the sintering agent is dispersed therein preferably at least significantly or substantially uniformly. The sintering agent and/or source thereof is particulate in form and the particles need only be of a size which will form the desired mixture, and generally, they are less than about 20 microns.

If desired, a pore-forming additive may also be admixed with the powder to aid in producing the desired porosity in the sintered body. Conventional pore-forming additives can be used such as, for example, ammonium oxalate, polymethyl methacrylate or other materials which volatilize away on heating below sintering temperature. The pore-forming additive can be used in a conventional manner in an effective amount. Generally, the amount of pore-forming additive ranges from about 0.1% by weight to about 2% by weight of the mixture comprised of uranium dioxide, sintering agent and pore-forming additive.

A number of conventional techniques can be used to shape or press the mixture into a compact. For example, it can be extruded, injection molded, die pressed or isostatically pressed to produce the compact of desired shape. Any lubricants, binders or similar materials used to aid shaping of the mixture should have no significant deleterious effect on the compact or the resulting sintered body. Such shaping-aid materials are preferably of the type which evaporate on heating at relatively low temperatures, preferably below 500° C., leaving no significant residue. Preferably, the compact has a porosity of less than about 60% and more preferably less than about 50% to promote densification during sintering.

The compact can have any desired configuration such as, for example, a pellet, cylinder, plate or square. Typically, the compact is in the form of a cylinder, usually a right cylinder.

The compact is sintered under conditions which will produce the present sintered body. The compact is sintered in an atmosphere which can vary depending largely on the particular manufacturing process. Preferably, the atmosphere is at or about ambient or at or about atmospheric pressure. The compact can be sintered in an atmosphere which is known to be useful for sintering uranium dioxide alone in the production of uranium dioxide nuclear fuel. However, sintering in a vacuum would not be useful since it would tend to vaporize the $SiO_2$. Generally, the compact is sintered in an atmosphere selected from the group consisting of hydrogen, wet hydrogen preferably having a dewpoint of about 20° C., a controlled atmosphere of a mixture of gases which in equilibrium produces a partial pressure of oxygen sufficient to maintain the uranium dioxide at a desired oxygen to uranium atomic ratio and a combination thereof. Representative of a suitable mixture of gases which in equilibrium produces a partial pressure of oxygen is carbon dioxide and carbon monoxide as disclosed in U.S. Pat. No. 3,927,154 to Carter assigned to the assignee hereof and incorporated herein by reference.

The compact is sintered at a temperature at which the sintering agent forms a liquid phase with the uranium dioxide which enables production of the present liquid phase-sintered body. Generally, the higher the $SiO_2$ content of the sintering agent the lower is the temperature at which the liquid phase forms. The present sintering temperature ranges from above about 1500° C. to a temperature at which there is no significant vaporization of $SiO_2$. Generally, it ranges from above about 1500° C. to about 2000° C., preferably from about 1540° C. to about 1750° C., and more preferably from about 1600° C. to about 1700° C.

In one embodiment, the present sintering agent has a composition encompassed and defined by polygon HBC excluding line HB and point C, i.e. a composition comprised of from about 70 weight % to about 90 weight % $SiO_2$, balance MgO and $Al_2O_3$, and generally produces a glassy phase of about the same composition in the sintered body.

In another embodiment, the present sintering agent has a composition encompassed and defined by polygon EBCF excluding lines EB and CF i.e. a composition comprised of from about 60 weight % to about 90 weight % $SiO_2$, balance MgO and $Al_2O_3$. Generally, with the sintering agent of this embodiment, at sintering temperature only solid uranium dioxide and a liquid phase are present. On cooling, generally such liquid phase produces only a glassy magnesium aluminosilicate phase. However, with decreasing cooling rates, determinable empirically, the composition of the present sintering agent close to line EF, generally within 5 weight % of line EF, or on line EF, may also precipitate some crystalline silicate phase in the glassy phase in pockets between the coated uranium dioxide grains. Generally, the glassy phase has a composition which is about the same as, or which does not differ significantly from, that of the sintering agent. Also, generally, the glassy phase, or glassy phase and any crystalline silicate phase which may form, are present in an amount which is the same as, or which does not differ significantly from, the amount of sintering agent used.

In another embodiment, the present sintering agent has a composition encompassed and defined by polygon AEFD excluding lines AE, EF and FD and generally produces in the sintered body a glassy phase and crystalline silicate phase. Polygon AEFD excluding lines AE, EF and FD has a composition comprised of from about 45 weight % to less than about 80 weight % $SiO_2$ balance MgO and $Al_2O_3$. However, in this embodiment, the resulting glassy phase has a composition encompassed and defined by polygon GHCI excluding lines GH and CI, i.e. a composition comprised of from about 50 weight % to about 90 weight % $SiO_2$, balance MgO and $Al_2O_3$. Also, generally, in this embodiment of the invention, the total amount of glassy and crystalline silicate phases produced is the same as, or does not differ significantly from, the amount of sintering agent used.

In the present sintered body which contains crystalline silicate phase, the total amount of glassy and crystalline silicate phases generally ranges from about 0.1% by weight to about 1% by weight of the sintered body with the glassy phase component being present in an amount of at least about 0.05% by weight of the sintered body, and the crystalline silicate phase component being present in at least a detectable amount, i.e. an amount detectable by transmission electron microscopy and selected area electron diffraction.

When the sintering agent has a composition encompassed and defined by polygon AEFD excluding lines AE, EF and FD, it may or may not be totally liquid at sintering temperature. When it is totally liquid, cooling of the liquid phase generally precipitates out some crystalline silicate and produces a sintered body wherein crystalline silicate grains are present in the glassy phase in pockets between the coated uranium dioxide grains. However, at lower sintering temperatures and/or higher MgO and/or $Al_2O_3$ contents, the sintering agent may produce a liquid phase and also some crystalline silicate at sintering temperature which results in a sintered body wherein small grains of crystalline silicate are present in the glassy phase in pockets between the coated uranium dioxide grains and wherein large grains of crystalline silicate protrude into the coated uranium dioxide grains. The crystalline silicate grains which protrude into the uranium dioxide grains are significantly larger, usually at least about 20% larger, than crystalline silicate grains located in the glassy phase. Also, the crystalline silicate grains which protrude into the uranium dioxide grains generally are present in an amount of less than about 50% by volume of the total amount of crystalline silicate phase present in the sintered body.

Any crystalline silicate phase in the present sintered body is selected from the group consisting of $MgSiO_3$, $Mg_2SiO_4$, mullite, a magnesium aluminosilicate such as cordierite and a mixture thereof. As the composition of the present sintering agent moves downwardly from line EF to line AD, the content of crystalline silicate phase in the sintered body increases. The composition of the sintering agent generally determines the composition of the crystalline silicate phase. For example, for a composition within polygon AEFD of FIG. 1, the portion close to line AE generally forms crystalline magnesium silicate whereas the portion close to line DF generally forms mullite. The composition falling within the central portion of polygon AEFD forms a mixture of crystalline magnesium silicate and mullite and/or crystalline magnesium aluminosilicate.

The compact is maintained at sintering temperature for a time required to produce the present sintered body. Time at sintering temperature is determinable empirically depending largely on the particular sintered body desired. Generally, the grain size of uranium dioxide in the sintered body is determined by sintering temperature, time at sintering temperature and by the sintering agent. Ordinarily, the higher the sintering temperature and/or the longer the time at sintering temperature, the larger are the uranium dioxide grains. Higher magnesium oxide and/or aluminum oxide contents in the sintering agent also usually result in larger uranium dioxide grains.

The rate of heating to sintering temperature is limited largely by how fast any by-product gases are removed prior to sintering and generally this depends on the gas flow rate through the furnace and its uniformity therein as well as the amount of material in the furnace. Generally, a rate of heating of from about 50° C. per hour to about 300° C. per hour is used until by-product gases have been removed from the furnace, and this may be determined empirically by standard techniques. The rate of heating can then be increased, if desired, to a range of about 300° C. to 500° C. per hour and as high as 800° C. per hour but should not be so rapid as to crack the bodies.

Upon completion of sintering, the sintered product is cooled to produce the present sintered body, and usually it is cooled to ambient or to about room temperature, generally about 20° C. to 30° C. The rate of cooling of the sintered product or body is not critical, but it should not be so rapid as to crack the body. Specifically, the rate of cooling can be the same as the cooling rates normally or usually used in commercial sintering furnaces. These cooling rates may range from about 100° C. to about 800° C. per hour. The sintered product or body can be cooled in the same atmosphere in which it was sintered or a different atmosphere which has no significant deleterious effect thereon.

In one embodiment, the present sintered body is comprised of crystalline uranium dioxide grains and an amorphous glassy magnesium aluminosilicate phase comprised of a composition encompassed and defined by polygon EBCF excluding lines EB and CF. In this embodiment, the glassy phase ranges from about 0.1% by weight to about 1% by weight of the sintered body. Frequently, it ranges from about 0.1% by weight to about 0.8% by weight, or from about 0.2% by weight to about 0.6% by weight, or from about 0.25% by weight to about 0.5% by weight, or from about 0.1% by weight to less than about 0.5% by weight, or from about 0.1% by weight or 0.2% by weight to about 0.4% by weight, of the sintered body.

In another embodiment, the present sintered body is comprised of crystalline uranium dioxide, glassy magnesium aluminosilicate phase and crystalline silicate phase, with the crystalline silicate phase being present in at least a detectable amount and the glassy phase being present in an amount of at least about 0.05% by weight of the body. In this embodiment, the glassy phase is comprised of a composition encompassed and defined by polygon GHCI excluding lines GH and CI. Generally, in this embodiment, the total amount of glassy and crystalline silicate phases is the same as, or does not differ significantly from, the amount of sintering agent used. Specifically, the total amount of glassy and crystalline silicate phases ranges from about 0.1% by weight to about 1% by weight, or from about 0.1% by weight to about 0.8% by weight, or from about 0.2% by weight to about 0.6% by weight, or from about 0.25% by weight to about 0.5% by weight, or from about 0.1% by weight to less than about 0.5% by weight, or from about 0.1% by weight or 0.2% by weight to about 0.4% by weight, of the sintered body.

Frequently, the glassy phase component is present in an amount greater than about 0.05% by weight, or greater than about 0.1% by weight, or greater than about 0.2% by weight of the sintered body. Also, frequently, the crystalline silicate phase component is present in an amount of at least about 0.01% by weight, or at least about 0.1% by weight, or at least about 0.2% by weight, of the sintered body.

The present sintering agent in an amount of less than about 0.1% by weight may not produce the present sintered body. On the other hand, the sintering agent in an amount greater than about 1% by weight produces an excessive amount of glassy and/or crystalline silicate phases which provide no significant advantage, and which would occupy space that could usefully be occupied by uranium dioxide.

Generally, the glassy phase in the sintered body is free of uranium dioxide. However, it is possible that in some instances some uranium dioxide might be present in the glassy phase in a minor amount detectable by exotic analysis not believed to be presently available, and in such instances, the uranium dioxide ordinarily would range up to about 0.5% by weight of the glassy phase.

The glassy magnesium aluminosilicate phase in the sintered body is a continuous interconnecting phase. The glassy phase coats each uranium dioxide grain leaving no significant portion thereof exposed of at least about 99% by volume, preferably more than 99.5% by volume, of the total volume of uranium dioxide grains in the sintered body. Most preferably, it coats every uranium dioxide grain leaving no significant portion thereof exposed. By a glassy phase which coats a uranium dioxide grain leaving no significant portion thereof exposed it is meant a coating which covers at least substantially all of the grain. Specifically, the glassy phase forms a thin continuous adherent coating on each uranium dioxide grain it coats which generally ranges from about 5 to about 20 Angstroms in thickness. In a preferred embodiment, the glassy phase coats each uranium dioxide grain totally, i.e. it totally envelops, each uranium dioxide grain of at least about 99% by volume, preferably more than 99.5% by volume, of the total volume of uranium dioxide grains in the sintered body. More preferably, the glassy phase coats every uranium dioxide grain totally. The glassy phase also extends to some degree into the interstices, i.e. 3-grain and 4-grain interstices, between the coated uranium dioxide grains. The extent to which the glassy phase fills the interstices depends largely on the amount of sintering agent in the sintered body. The morphology of the microstructure of the sintered body indicates that the glassy phase was a liquid at sintering temperature.

The uranium dioxide grains in the sintered body have an average grain size, i.e. average diameter, ranging from about 20 microns to about 100 microns, preferably from about 30 microns to about 80 microns, frequently from about 40 microns to about 70 microns, and more frequently from about 45 microns to about 60 microns. In one embodiment of the present invention, the uranium dioxide grains do not differ significantly in size.

The average grain size can be determined in a standard manner. In the present invention a standard line intercept technique was used. Specifically, a line was drawn on a photomicrograph of a polished and etched cross-section of the sintered body, and the grain boundaries intercepting along a specific length of line were counted and divided into that specific length of line to give an average grain intercept length in terms of microns. That value was then multiplied by 1.5 to determine the average grain size.

The present sintered body has the appearance of having been liquid phase sintered. The uranium dioxide grain corners as viewed in a polished section often appear rounded with glassy phase pockets located at the grain corner, i.e. they have the appearance of a liquid phase sintered ceramic. Generally, the uranium dioxide grains are equiaxed or substantially equiaxed.

The present sintered body generally is free of crystalline phases of $Al_2O_3$, MgO and $SiO_2$.

The present sintered body always contains some porosity which generally is a closed porosity, i.e. non-interconnecting pores. The porosity is distributed through the sintered body, and preferably, it is distributed at least significantly or substantially uniformly. Generally, the porosity of the sintered body ranges from about 2% by volume to less than about 10% by volume of the sintered body depending largely on reactor design. Frequently, the porosity ranges from about 4% by volume to about 8% by volume, more frequently from about 4% by volume to about 6% by volume, and most frequently about 5% by volume, of the total volume of the sintered body. Preferably, the pores range in size from greater than about 1 micron to about 20 microns, and more preferably from about 5 microns to about 20 microns.

Ordinarily, the dimensions of the present sintered body differ from those of the unsintered body by the extent of shrinkage, i.e. densification, which occurs during sintering.

A sintering agent outside the present range generally is not operable to produce the present sintered body. Generally, a sintering agent containing more than about 90 weight % $SiO_2$ will produce a sintered body with too small a grain size. On the other hand, a sintering agent containing more than the present amounts of MgO and $Al_2O_3$ generally is not useful because the amount of glassy phase usually is too small with most of the sintering agent present as crystalline silicate.

$SiO_2$ alone is not useful as a sintering agent because it produces a sintered body with too small a grain size, and the glassy phase formed does not distribute itself uniformly throughout the sintered body. $Al_2O_3$ or MgO alone would leave crystalline $Al_2O_3$ or MgO, respectively, in the sintered body. Crystalline phases do not impart plasticity at elevated temperature to a sintered uranium dioxide body which is significantly higher than that of uranium dioxide alone.

The present sintered body is useful as a nuclear fuel. It has an oxygen to uranium atomic ratio ranging from about 1.7 to about 2.25, frequently from about 2.00 to about 2.15. The sintered body contains fissionable material generally in the same amount present in the uranium dioxide powder. The large grain size of the present sintered body should lower fission gas release rates significantly. Also, the glassy phase coating the uranium dioxide grains imparts to the sintered body a plasticity or creep rate which allows the fuel to perform without putting significant sustained stress on the cladding.

The invention is further illustrated by the following examples wherein the procedure was as follows unless otherwise stated:

Submicron sinterable uranium dioxide powder containing a fissionable isotope of uranium and having an oxygen to uranium atomic ratio of about 2.16 was used.

Density was determined in a standard manner by weighing the sintered body and measuring its dimensions.

Porosity of the sintered body was determined by knowing or estimating the theoretical density of the sintered body on the basis of its composition and comparing that to the density measured using the following equation:

$$\text{porosity} = \left(1 - \frac{\text{measured density}}{\text{theoretical density}}\right) 100\%$$

Average uranium dioxide grain size of the sintered body was determined by the line intercept method disclosed herein.

The sintered body was characterized by a number of standard techniques.

Based on other work, it was known that the sintered body had an oxygen to uranium atomic ratio of about 2.00.

EXAMPLE 1

Powders of $Mg(NO_3)_2 \cdot 6H_2O$, $Al_2O_3$ and $SiO_2$ were used in this example in amounts which, on thermal decomposition of $Mg(NO_3)_2 \cdot 6H_2O$ below sintering temperature to form MgO, would produce a sintering agent comprised of about 5 weight % MgO, about 17 weight % $Al_2O_3$ and about 78 weight % $SiO_2$.

The three powders were admixed with the uranium dioxide powder in a standard manner by stirring to produce a substantially uniform mixture, which on thermal decomposition of $Mg(NO_3)_2 \cdot 6H_2O$ would contain the sintering agent in an amount of about 0.125% by weight of the total weight of the mixture comprised of sintering agent and uranium dioxide powder.

The mixture was die pressed in a steel die to produce a pellet, i.e. a compact in the form of a roughly equiaxed cylinder with a porosity of about 50%.

The compact was sintered at about 1640° C. for 7 hours in an atmosphere of hydrogen at or about atmospheric pressure and then furnace-cooled to about room temperature.

A polished cross-section of the sintered body was examined by light microscopy. Uranium dioxide grains and a thin intergranular glassy phase were observed.

The sintered body had a porosity of about 2.6% by volume which was comprised of closed pores distributed in the body.

The uranium dioxide grains did not differ significantly in size and had an average size of about 21 microns.

Example 1 is illustrated in Table II. Examples 2–6 of Table II were carried out in the same manner as Example 1 except as noted therein. In all of the examples $Mg(NO_3)_2 \cdot 6H_2O$ was used as a precursor for MgO. In Table II, the given amount of sintering agent is % by weight of the mixture comprised of sintering agent and uranium dioxide powder.

TABLE II

| | Sintering Agent | | | | Sintered Body | |
|---|---|---|---|---|---|---|
| Ex. | MgO wt % | $Al_2O_3$ wt % | $SiO_2$ wt % | % by weight | Avg. grain size | Porosity % |
| 1 | 5 | 17 | 78 | 0.125 | 21 | 2.6 |
| 2 | 5 | 17 | 78 | 0.250 | 21 | — |
| 3 | 5 | 17 | 78 | 0.500 | 24 | — |
| 4 | 5 | 43 | 52 | 0.125 | 30 | — |
| 5 | 5 | 43 | 52 | 0.250 | 26 | — |

TABLE II-continued

| Ex. | Sintering Agent | | | | Sintered Body | |
| --- | --- | --- | --- | --- | --- | --- |
| | MgO wt % | Al₂O₃ wt % | SiO₂ wt % | % by weight | Avg. grain size | Porosity % |
| 6 | 5 | 43 | 52 | 0.500 | 27 | — |

All of the examples of Table II illustrate the present invention and all of the bodies produced therein are useful as nuclear fuel. Polished cross-sections of the sintered bodies of Examples 3 and 6 were examined by light microscopy. Uranium dioxide grains and an intergranular glassy phase were observed.

Based on other work, it is known that the glassy phase in the sintered bodies of Examples 1–3 is a magnesium aluminosilicate having a composition falling within the polygon EHCF.

Based on other work, it is known that the glassy phase in the sintered bodies of Examples 4–6 is a magnesium aluminosilicate having a composition encompassed and defined by polygon GHCI excluding lines GH and CI and that a detectable amount of a crystalline magnesium silicate, probably mullite, is present.

Also, based on other work, it was known that the total amount of glassy phase in each sintered body, or the total amount of glassy phase and crystalline magnesium silicate phase, did not differ significantly from the amount of sintering agent used. Also, based on other work, it was known that the glassy phase was continuous, interconnecting and coated each uranium dioxide grain of more than 99% by volume of the uranium dioxide grains leaving no significant portion thereof exposed.

Based on other work, it is known that the creep rate of all of the sintered bodies of Table II should increase rapidly with stress and should be substantially higher than that reported in the literature for similar sintered bodies of uranium dioxide alone of smaller average grain size. The high deformation rate of the present nuclear fuel will allow the fuel to perform without putting significant stress on the cladding.

Also, the larger grain size of the present fuel should result in significantly lower fission gas release rates.

What is claimed is:

1. A process for producing a sintered uranium dioxide body useful as nuclear fuel wherein the uranium dioxide grains have an average grain size ranging from about 30 microns to about 80 microns and wherein at least about 99% by volume of the uranium dioxide grains are each coated with glassy magnesium aluminosilicate phase leaving no significant portion thereof exposed, said body having a porosity ranging from about 2% by volume to less than about 10% by volume, which consists essentially of providing uranium dioxide power containing a fissionable substance, providing a sintering agent having a composition encompassed and defined by polygon ABCD excluding lines AB and CD of Figure 1 or precursor therefor, admixing said sintering agent or precursor therefor with said uranium dioxide to give said sintering agent composition ranging from about 0.1% by weight to about 0.8% by weight of a sinterable mixture consisting essentially of said centering agent composition and uranium dioxide, forming the resulting mixture into a compact, sintering said compact at a temperature at which said sintering agent forms a liquid phase ranging from greater than about 1500° C. to a temperature at which there is no significant vaporization of said SiO₂ under conditions wherein the oxygen to uranium atomic ratio ranges from about 1.7 to about 2.25 to produce a sintered product having said average grain size and cooling said sintered product to produce said sintered body, said precursor thermally decomposing below said sintering temperature.

2. The process according to claim 1 wherein said oxygen to uranium atomic ratio ranges from about 2.00 to about 2.15.

3. The process according to claim 1 wherein said porosity of said sintered body ranges from about 4% by volume to about 8% by volume of said sintered body.

4. The process according to claim 1 wherein said sintering agent composition ranges from about 0.2% by weight to about 0.4% by weight of said sinterable mixture.

5. The process according to claim 1 wherein said sintering agent composition ranges from about 0.1% by weight to about 0.2% by weight of said sinterable mixture.

6. The process according to claim 1 wherein said sintering agent composition ranges from about 0.2% by weight to about 0.6% by weight of said sinterable mixture.

7. The process according to claim 1 wherein said sintering agent composition ranges from about 0.1% by weight to less than about 0.5% by weight of said sinterable mixture.

8. The process according to claim 1 wherein said sintering agent has a composition encompassed and defined by polygon EBCF excluding lines EB and CF.

9. The process according to claim 1 wherein said sintering agent has a composition encompassed and defined by polygon AEFD excluding lines AE, EF and FD.

10. The process according to claim 1 wherein said sintering temperature ranges from about 1540° C. to 1800° C.

11. The process according to claim 1 wherein said precursor is magnesium carbonate.

12. The process according to claim 1 wherein said sintering is carried out in a gaseous atmosphere of wet hydrogen.

13. The process according to claim 1 wherein said sintering is carried out in a gaseous atmosphere comprised of a mixture of carbon dioxide and carbon monoxide.

14. The process according to claim 1 wherein said average grain size of uranium dioxide ranges from about 30 microns to about 70 microns.

15. A nuclear fuel body consisting essentially of crystalline uranium dioxide grains and an amorphous glassy phase of magnesium aluminosilicate, said uranium dioxide grains having an average size ranging from about 30 microns to about 80 microns, said glassy phase being continuous and interconnecting, each grain of at least about 99% by volume of said uranium dioxide grains being coated with said glassy phase leaving no significant portion thereof exposed, said glassy phase ranging from about 0.1% by weight to about 0.8% by weight of said body, said body having a porosity ranging from about 2% by volume to less than about 10% by volume of said body.

16. The body according to claim 15 wherein said glassy phase is comprised of a composition encompassed and defined by polygon GBCI excluding lines GB and CI.

17. The body according to claim 15 wherein said glassy phase is encompassed and defined by polygon HBC of FIG. 1 excluding line HB and point C.

18. The body according to claim 15 wherein said glassy phase is encompassed and defined by polygon EBCF of FIG. 1 excluding lines EB and CF.

19. The body according to claim 15 wherein said glassy phase is encompassed and defined by polygon GHCI of FIG. 1 excluding lines GH and CI and said body contains crystalline silicate phase in at least a detectable amount.

20. A nuclear fuel body consisting essentially of crystalline uranium dioxide grains, an amorphous glassy magnesium aluminosilicate phase and crystalline silicate phase, said uranium dioxide grains having an average size ranging from about 30 microns to about 80 microns, said glassy phase being continuous and interconnecting, each grain of at least about 99% by volume of said uranium dioxide grains being coated by said glassy phase leaving no significant portion thereof exposed, the total amount of said glassy and crystalline silicate phases ranging from about 0.1% by weight to about 0.8% by weight of said body, said glassy phase being present in an amount of at least about 0.05% by weight of said body, said crystalline silicate phase being present in at least a detectable amount, said body having a porosity ranging from about 2% by volume to less than about 10% by volume of said body.

21. The nuclear fuel body according to claim 20 wherein said crystalline silicate phase is present in said glassy phase in pockets between said coated uranium dioxide grains.

22. The nuclear fuel body according to claim 20 wherein said crystalline silicate phase is present in said glassy phase in pockets between said coated uranium dioxide grains and also protrudes into said coated uranium dioxide grains.

23. The nuclear fuel body according to claim 20 wherein said glassy phase has a composition encompassed and defined by polygon GHCI excluding lines GH and CI.

24. The nuclear fuel body according to claim 20 wherein said crystalline silicate is selected from the group consisting of $MgSiO_3$, $Mg_2SiO_4$, mullite, magnesium aluminosilicate and a mixture thereof.

25. The nuclear fuel body according to claim 20 wherein said porosity ranges from about 4% by volume to about 8% by volume of said body.

26. The nuclear fuel body according to claim 20 wherein said average size of said uranium dioxide grains ranges from about 40 microns to about 70 microns.

27. The nuclear fuel body according to claim 20 wherein said glassy phase is present in an amount greater than about 0.05% by weight of said body, and said crystalline silicate phase is present in an amount of at least about 0.01% by weight of said body.

28. The process according to claim 1 wherein said uranium dioxide grains have an average size ranging from about 40 microns to about 70 microns.

29. The process according to claim 1 wherein said uranium dioxide grains have an average size ranging from about 45 microns to about 60 microns.

30. The process according to claim 1 wherein a natural material is used to provide at least part of said sintering agent, said material when fired but below said sintering temperature having a fired composition consisting essentially of said part of said sintering agent and impurities in an amount of less than about 10% by weight of the fired composition.

31. The nuclear fuel body according to claim 15 wherein said uranium dioxide grains have an average size ranging from about 40 microns to about 70 microns.

32. The nuclear fuel body according to claim 15 wherein said uranium dioxide grains have an average size ranging from about 45 microns to about 60 microns.

33. The nuclear fuel body according to claim 20 wherein said uranium dioxide grains have an average size ranging from about 45 microns to about 60 microns.

* * * * *